US010678343B2

(12) United States Patent
Barel et al.

(10) Patent No.: US 10,678,343 B2
(45) Date of Patent: Jun. 9, 2020

(54) PASSIVE MECHANICAL KEYBOARD

(71) Applicant: Microsoft Technology Licensing, LLC, Redmond, WA (US)

(72) Inventors: Eliyahu Barel, Tel Aviv (IL); Amir Zyskind, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 15/925,753

(22) Filed: Mar. 19, 2018

(65) Prior Publication Data

US 2019/0286247 A1    Sep. 19, 2019

(51) Int. Cl.
*G06F 3/02*    (2006.01)
*G06F 3/044*   (2006.01)

(52) U.S. Cl.
CPC .......... *G06F 3/0219* (2013.01); *G06F 3/0202* (2013.01); *G06F 3/044* (2013.01)

(58) Field of Classification Search
CPC ....... G06F 1/1662–1669; G06F 3/0219; G06F 3/0227; G06F 3/023; G06F 3/044; G06F 3/0202
See application file for complete search history.

(56) References Cited

U.S. PATENT DOCUMENTS

| 4,228,330 A | 10/1980 | Larson |
| 6,492,978 B1 | 12/2002 | Selig et al. |
| 7,659,885 B2 | 2/2010 | Kraus et al. |
| 8,258,986 B2 | 9/2012 | Makovetskyy |
| 8,988,355 B2 | 3/2015 | Solomon et al. |
| 9,285,837 B2 | 3/2016 | Meierling et al. |
| 9,363,253 B2 | 6/2016 | Sangster et al. |
| 9,465,446 B2 | 10/2016 | Kaiser et al. |
| 9,638,731 B2 | 5/2017 | Hu |

(Continued)

FOREIGN PATENT DOCUMENTS

| CN | 201590065 U | 9/2010 |
| CN | 102033672 A | 4/2011 |
| CN | 102262313 B | 3/2014 |

OTHER PUBLICATIONS

Murray, Peter, "Buttons Morph Out of your Touchscreen with Tactus", Retrieved from: https://singularityhub.com/2012/06/05/buttons-morph-out-of-your-touchscreen-with-tactus/, Jun. 5, 2012, 04 Pages.

(Continued)

*Primary Examiner* — Xuemei Zheng

(57) ABSTRACT

A keyboard has a keypad layer of resiliently depressible keypads. The keyboard has a skin of dielectric material, covering a base of the keyboard. The skin contacts a capacitive touchscreen in use, and an actuating layer is on a face of the skin of dielectric material away from the base. The actuating layer comprises a plurality of conductive regions, one per keypad. A grounding layer is between the actuating layer and the keypad layer and spaced from the actuating layer during a rest state of the keyboard. Upon depression of a keypad, the keypad presses a region of the grounding layer under the keypad towards a region of the actuating layer such that the region of the actuating layer becomes grounded and causes a change in capacitance detectable by the capacitive touchscreen.

20 Claims, 12 Drawing Sheets

(56) References Cited

U.S. PATENT DOCUMENTS

| | | |
|---|---|---|
| 2007/0247431 A1* | 10/2007 | Skillman .................. G06F 3/023 |
| | | 345/169 |
| 2010/0238119 A1 | 9/2010 | Dubrovsky et al. |
| 2011/0241999 A1 | 10/2011 | Thier |
| 2012/0194448 A1* | 8/2012 | Rothkopf ............. H04B 1/3822 |
| | | 345/173 |
| 2013/0129398 A1 | 5/2013 | Koepke |
| 2013/0335327 A1 | 12/2013 | Solomon et al. |
| 2014/0022174 A1 | 1/2014 | Chen |
| 2014/0063362 A1 | 3/2014 | Di et al. |
| 2015/0193010 A1 | 7/2015 | Tsukamoto et al. |

OTHER PUBLICATIONS

"International Search Report and Written Opinion Issued in PCT Application No. PCT/US19/021523", dated Jun. 4, 2019, 11 Pages.

* cited by examiner

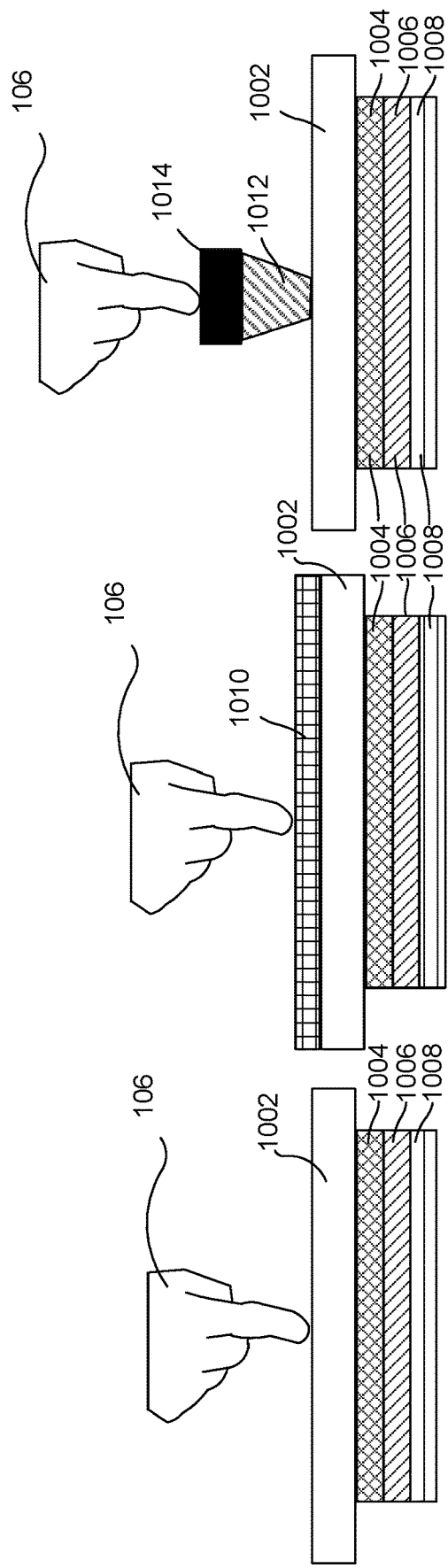

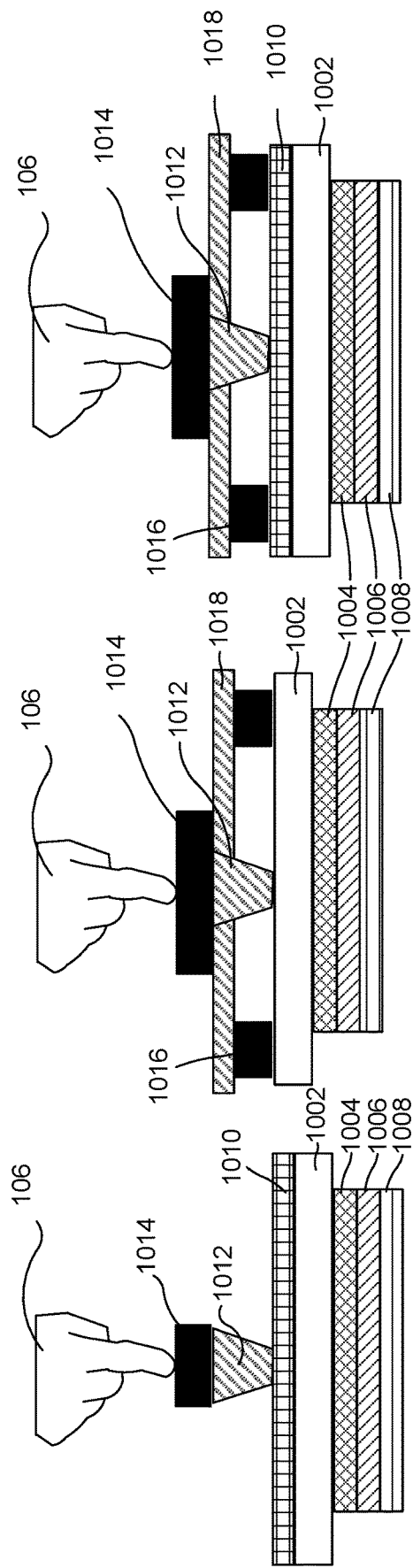

PASSIVE MECHANICAL KEYBOARD

BACKGROUND

The technology generally relates to mechanical keyboards for use with touchscreen computing devices such as tablet computers, smart phones and the like. Mechanical keyboards comprise a plurality of individual keypads arranged in rows in a frame or chassis. The keypads are biased into a rest position by a biasing mechanism such as a spring or other biasing mechanism and are depressible by a user during typing. One or more sensors in the mechanical keyboard detect depression of individual ones of the keypads and in this way a user is able to depress keypads of the mechanical keyboard in order to generate a signal from the sensors where the signal specifies characters relating to the keypads. Mechanical keyboards are typically powered by a power source such as from a battery or a wired connection to a host computer.

In contrast, software keyboards comprise graphical elements that represent keypads displayed on a touchscreen display, and do not have depressible keypads. In the case of a software keyboard the touchscreen display enters a keyboard mode when the graphical elements depicting the keypads are displayed. In the keyboard mode, touch events at the touchscreen display are interpreted as selections of one or more of the keypads in order to type characters for input to a computing device associated with the touchscreen display.

For typing text into touchscreen devices, software keyboards are typically used since these are simple to display on a touchscreen and are intuitive to operate. Software keyboards are convenient for an end user since only the touchscreen device needs to be stored or transported and there is no need to store or transport a mechanical keyboard. However, software keyboards are difficult to use for touch typing as compared with mechanical keyboards due to a variety of reasons. Often the software keyboard does not feel very realistic to an end user (where realistic is like a mechanical keyboard) and this makes it harder to use the software keyboard. Often the user is unable to rest his or her hands easily in a home position ready for touch typing since the flat surface of the touchscreen device is cold and hard to the touch. The user may try to lift his or her wrists away from or over the edge of the touchscreen in order that the wrists do not interfere with the software keyboard. Over time the user has an increased risk of developing repetitive strain injuries due to in appropriate posture during typing using the software keyboard.

Manufacturing costs for software keyboards are significantly lower than for mechanical keyboards and in general, there is a desire to reduce manufacturing costs for mechanical keyboards. When mechanical keyboards are to be transported such as for use with portable computing devices there is a desire to improve the robustness and reduce the weight of the mechanical keyboards.

The embodiments described below are not limited to implementations which solve any or all of the disadvantages of known mechanical keyboards.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a passive mechanical keyboard. The keyboard has a keypad layer of resiliently depressible keypads. The keyboard has a skin of dielectric material, covering a base of the keyboard and having a touchscreen face configured to contact a capacitive touchscreen in use, and a working face. The keyboard has an actuating layer on the working face of the skin of dielectric material, the actuating layer comprising a plurality of conductive regions, one per keypad. A grounding layer is between the actuating layer and the keypad layer and spaced from the actuating layer during a rest state of the keyboard. Upon depression of one of the keypads, the keypad presses a region of the grounding layer under the keypad towards a region of the actuating layer such that the region of the actuating layer becomes grounded and causes a change in capacitance detectable by the capacitive touchscreen.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 10A shows a finger pressing on a cover glass of a touchscreen with no keyboard;

FIG. 10B shows a finger pressing on a fabric layer over a touchscreen;

FIG. 10C shows a finger pressing on a plastic spacer over a conductive element on a touchscreen;

FIG. 10D shows the situation of FIG. 10C and with a fabric layer between the touchscreen and the conductive element;

FIG. 10E shows a finger pressing on a plastic spacer on an electrically floating conductive metal plate on a conductive element on a touchscreen;

FIG. 10F shows the situation of FIG. 10E and with a fabric layer between the touchscreen and the conductive element.

Like reference numerals are used to designate like parts in the accompanying drawings.

DETAILED DESCRIPTION

Figure 1:
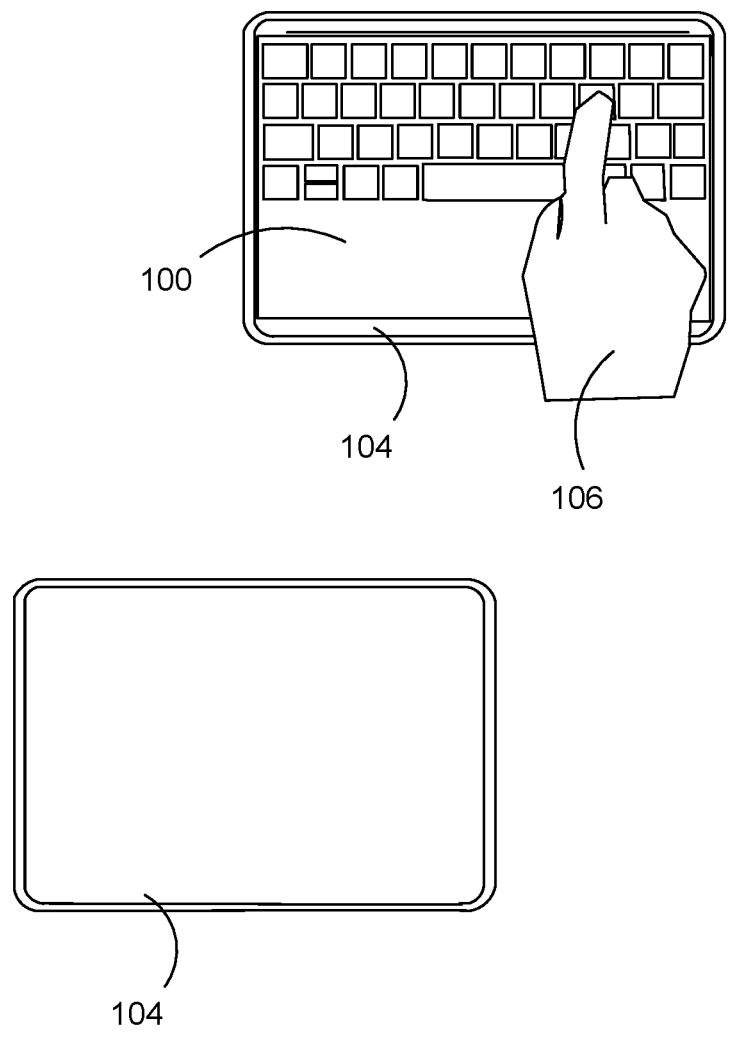
FIG. 1 shows a touchscreen computing device with a passive mechanical keyboard.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The term "touch event" is used herein to refer to a touch or a hover of an object above a touchscreen such that the touchscreen detects the presence of the object and is able to compute a two dimensional location of the object in the plane of the touchscreen. The touchscreen is any type of capacitive touchscreen which is able to compute a position signal indicating a position of a touch event at the touchscreen. Capacitive touch screens operate by detecting a change in capacitance introduced when a finger or other object comes close to or contacts the touchscreen.

The present technology is concerned with a passive mechanical keyboard which is a mechanical keyboard which is not actively powered. The passive mechanical keyboard is intended for use in conjunction with a touchscreen, such as in a touchscreen display. The passive mechanical keyboard is placed on a touchscreen in use, such as by laying the passive mechanical keyboard on the surface of a touchscreen. When the user depresses a keypad of the passive mechanical keyboard a touch event occurs at the touchscreen under the passive mechanical keyboard, as a result of part of the mechanical keyboard becoming grounded in order to trigger a touch event. The touch event is detected by the touchscreen and a position of the touch event on the touchscreen is calculated. A host computing device of the touchscreen has a mapping from the positions to identifiers of keypads of the mechanical keyboard. The host computing device converts the position of the touch event into an identifier of a keypad using the mapping. Each keypad is associated with a keyboard character and thus the passive mechanical keyboard is used to input keyboard characters into the host computing device.

Passive mechanical keyboards are very useful interfaces between touchscreen computing devices and a user. The keys of a passive mechanical keyboard are depressible and a user is able to feel the separate keys and know whether he or she has pressed a key. In contrast, data entry into a computer through a touchscreen alone is based on two dimensional virtual keypads displayed on the touchscreen. The virtual keypads are without depth or any feel other than the simple pressure reaction from the hard, flat touchscreen. The touchscreen surface is smooth and without surface differences so that it is easy for the user to make mistakes and touch several keypads at once, or press the wrong keypad.

When a finger touches a capacitive touchscreen, electrostatic charge in the touchscreen passes to ground through the user's body and there is a resulting drop in capacitance at the touchscreen. The change in capacitance is detected by the touchscreen and used to compute a position of the finger on the touchscreen. If the user is wearing gloves the electrical path to ground through the finger is broken by the non-conductive material of the glove.

Where a passive mechanical keyboard has a skin of dielectric material it is difficult for changes in capacitance at the touchscreen to be caused since the electrical path from the touchscreen, through the finger to ground is broken by the skin. This is especially the case where the skin is made of fabric since fabric typically has a high relative permittivity. As a result sensitivity of the touchscreen is reduced by the presence of the fabric skin. Having said that, fabric and other dielectric skins are very useful to keep out moisture and dust from the internal components of the keyboard. Fabric skins in particular improve tactile feedback given by a passive mechanical keyboard. Fabric skins also reduce the weight of the keyboard (as compared with using metal cases) and are simple to install during manufacture thus keeping costs down.

In various examples described herein, ways of increasing sensitivity to keypad presses in the context of a passive mechanical keyboard on a touchscreen are described, for cases where there is a dielectric skin on the face of the keyboard which overlies the touchscreen. Approaches where the dielectric skin is removed or partially cut away are avoided since these allow ingress of dirt and moisture to the keyboard and reduce the lifespan of the keyboard. Solutions where the thickness of the dielectric skin is minimized in regions under the keypads are also avoided since in this case the dielectric skin is prone to tear and/or puncture.

In various examples described herein, ways of increasing sensitivity to keypad presses in the context of a passive mechanical keyboard on a touchscreen are described in which it is not necessary to directly connect the keypads or other elements of the keyboard to a ground of the touchscreen. As a result an improved passive mechanical keyboard is given. Also, the functioning of a computing device comprising the touchscreen and the passive mechanical keyboard is improved.

FIG. 1 shows a touchscreen computing device in the form of a tablet computer. In the upper part of FIG. 1 the tablet computer has a touchscreen 104 with a passive mechanical keyboard 100 placed on it. A person is typing on the keyboard 100 using one finger and resting his or her hand 106 on a wrist support region of the keyboard. As the user types on the keyboard the touchscreen 104 detects the keypresses and maps the keypresses to characters which are input to the computing device. The lower part of FIG. 1 shows the touchscreen computing device 104 from FIG. 1A where the passive mechanical keyboard has been removed.

Figure 2:
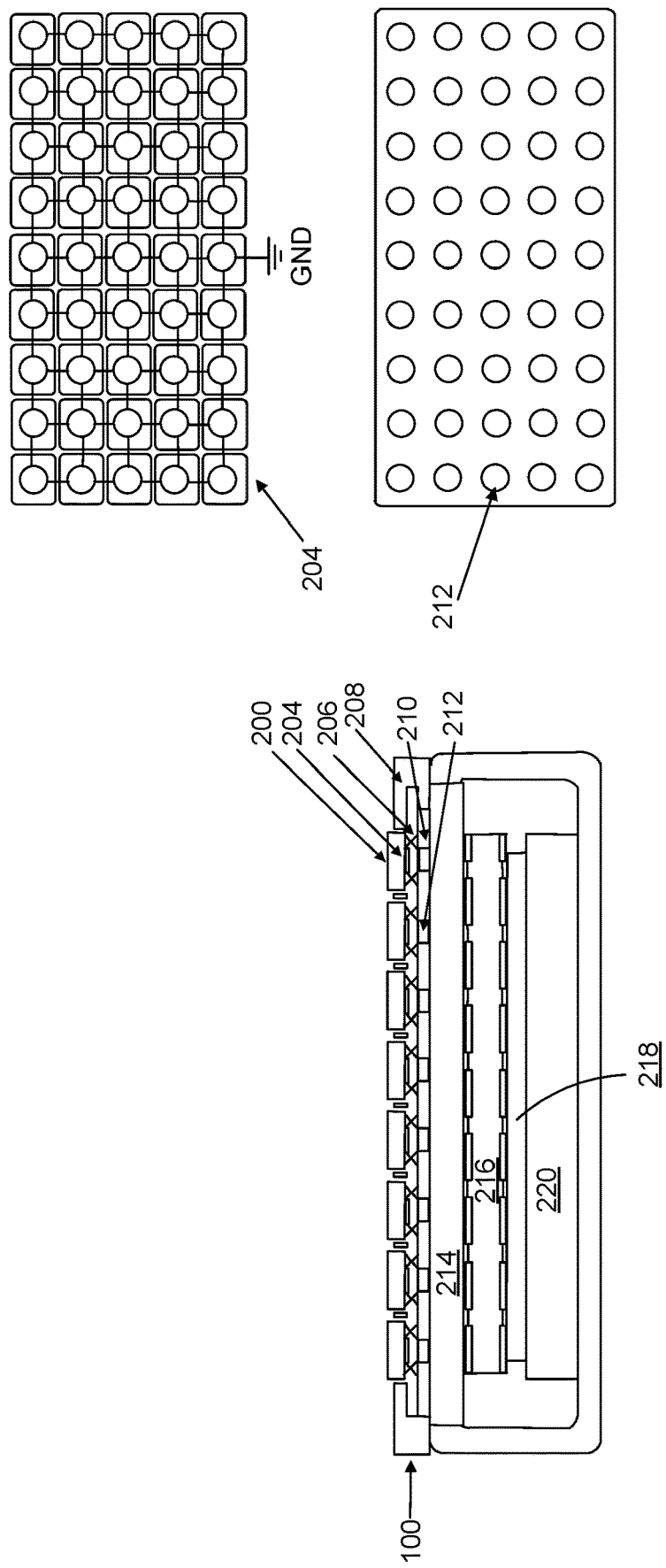
FIG. 2 is a cross section through a keyboard and also showing a grounding layer and an actuating layer.

FIG. 2 is a cross section through a passive mechanical keyboard 100 in situ on a touchscreen. The touchscreen has a layered structure comprising a liquid crystal display 220, a layer of optically clear adhesive (OCA) 218, a film sensor layer 216 comprising transmit and receive electrodes and a cover glass 214.

The passive mechanical keyboard 100 has a fabric skin covering its base, in contact with the cover glass 214. The fabric skin is not shown in FIG. 2 for clarity. The keyboard comprises a keypad layer 200 comprising a plurality of individual keypads which are resiliently depressible as a result of being supported by spring elements 206 which are deformable silicone cones or other spring elements. The resiliently depressible nature of the keypads means that when a keypad is pressed by a user it moves downwards in the direction of the pressing force, and that when the pressing force is removed, the keypad returns to the position it was in before it was pressed. The state of the keyboard where no keypads are pressed is referred to as a rest state of the keyboard. The keypads are formed of dielectric material and on the base of each keypad is a conductive region comprising conductive ink or a conductive plate or other conductive region. Together the conductive regions on the base of each keypad form a grounding layer 204 where the conductive regions are interconnected by wires or conductive tracks.

The keypad layer 200 is held within a keyboard bucket, where the keyboard bucket is made of conductive material and is attached to the touchscreen using magnetic or other fixing components. In some examples the grounding layer 204 is connected to the keyboard bucket as the connection enhances the grounding ability of the grounding layer 204.

The spring elements 206 rest on an actuating layer 212 of the keyboard. The actuating layer in this example is a printed circuit board having electrically floated conductive blobs printed on a dielectric substrate. The blobs are sized and positioned so that there is one blob under each keypad.

FIG. 2 shows a rest state of the keyboard where no keypads are depressed and in which the grounding layer 204 is spaced apart from the actuating layer 212 by the spring elements 206.

Figure 3:
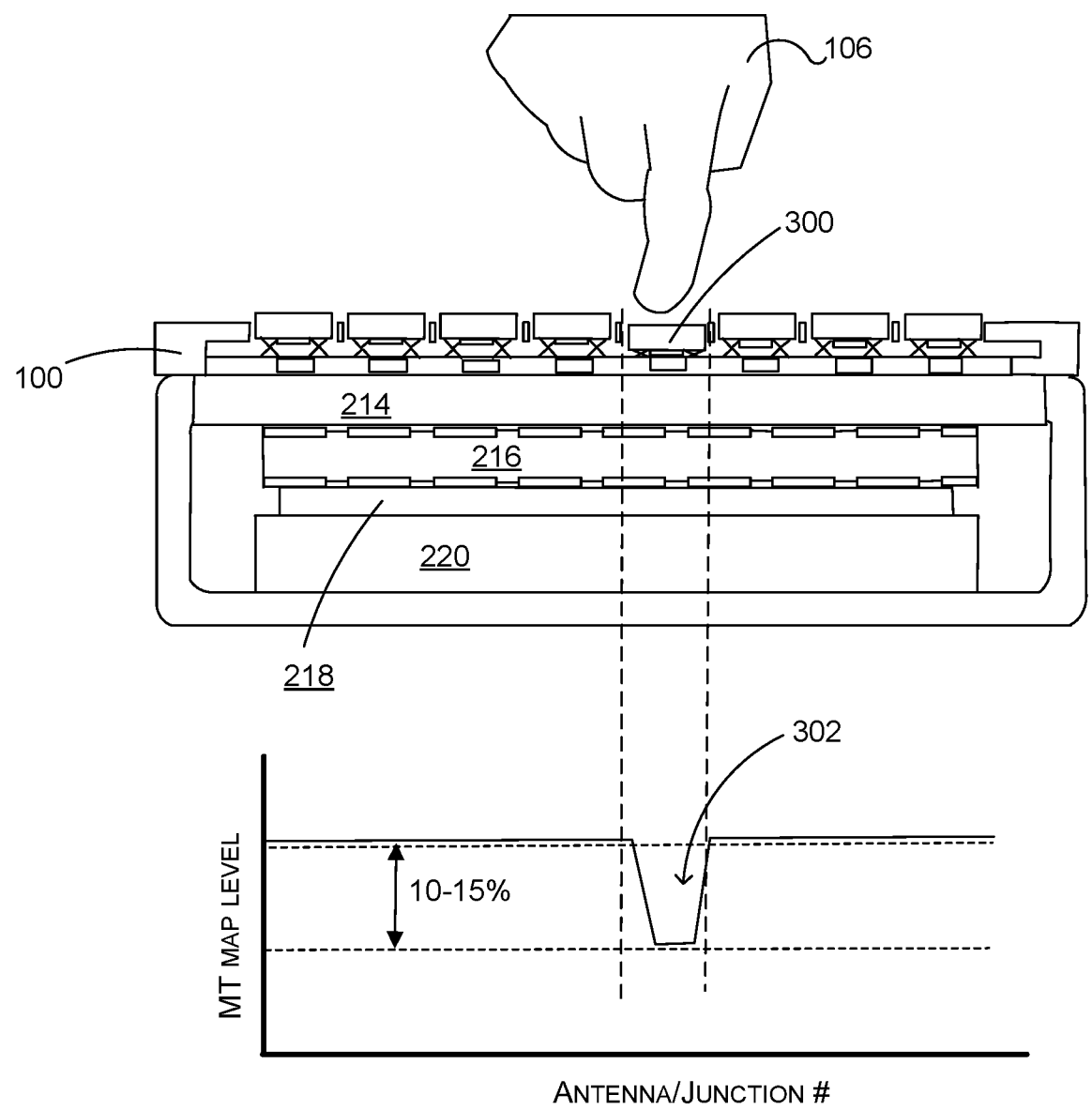
FIG. 3 is the cross section of FIG. 2 showing depression of a keypad and showing a resulting change in capacitance detected at a touchscreen.

FIG. 3 shows the mechanical keyboard 100 and touchscreen of FIG. 2 in the case that a user 106 presses one of the keypads 300. The user's finger exerts a force on the keypad which acts to compress the spring elements 206 under the keypad 300 and to cause the keypad 300 to press against a region of the grounding layer under the keypad 300. The region of the grounding layer under the keypad 300 moves towards the actuating layer and in some cases contacts the blob of conductive material on the actuating layer which is under the keypad 300. As a result, the blob of conductive material on the actuating layer becomes grounded since it either contacts the grounding layer or is close enough to the grounding layer that any charge in the blob of conductive material passes to the grounding layer. Consequently there is a reduction in capacitance at the blob on the actuating layer which is detected by the touchscreen. The graph in FIG. 3 shows a heat map level cross section which represents sensor signals that flow from a transmit electrode to a receive electrode at each intersection of a transmit and receive electrode in the touchscreen, against antenna junction number where the antenna junction number is an identifier of an intersection of a transmit and receive electrode in the touchscreen. It is seen that the capacitance of one of the antenna junction number corresponding to the keypad 300 drops at region 302 of the graph by about ten to fifteen percent which is enough for the touchscreen to detect a touch event and output a position signal corresponding to the position of keypad 300 on the touchscreen.

Figure 4:
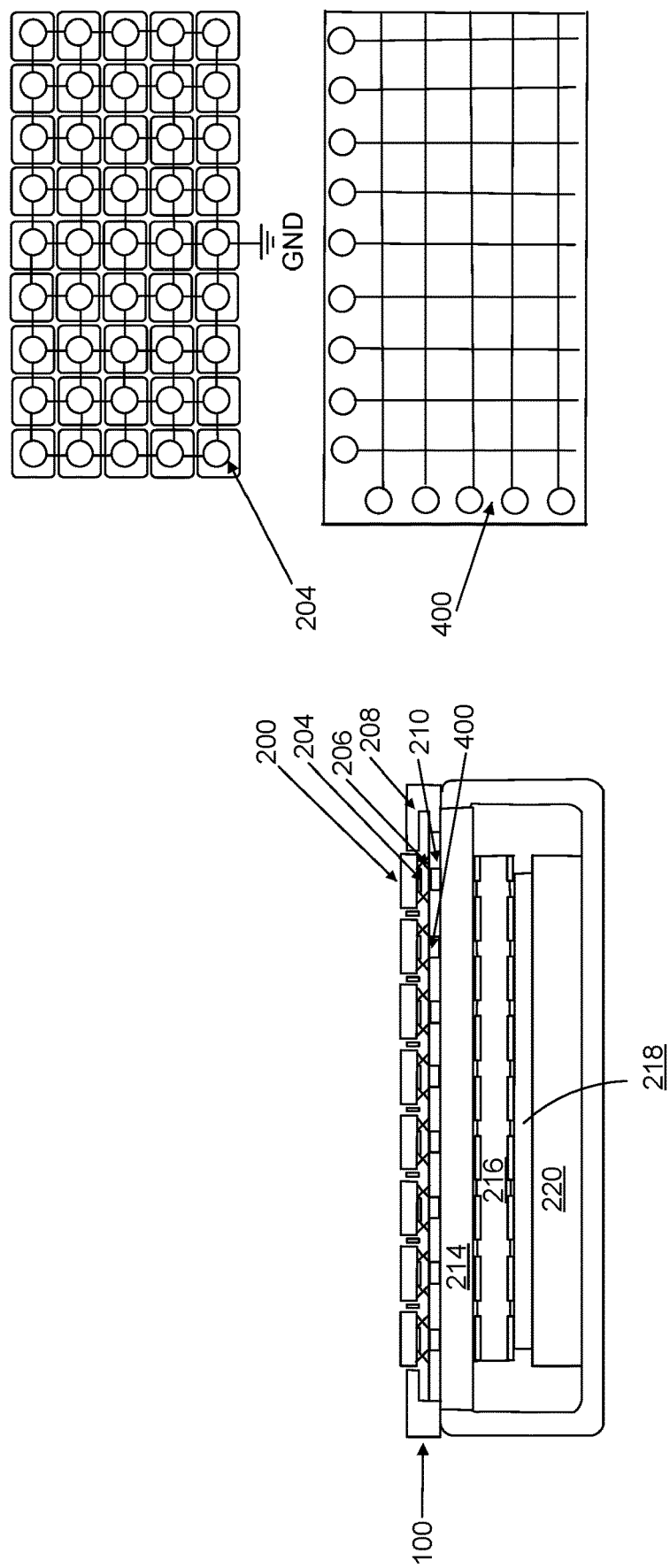
FIG. 4 is a cross section through another keyboard and showing a grounding layer and an actuating layer.

FIG. 4 is a cross section through another passive mechanical keyboard 100, again in situ on a touch screen. The touchscreen has the same construction as that of FIGS. 2 and 3. In this example the passive mechanical keyboard 100 is the same as that of FIGS. 2 and 3 except that the actuating layer is different. In this example, the actuating layer 400 comprises a grid of intersecting conductive lines, each line having a blob of conductive material at an end of the line, and where for each keypad there is an intersection of the grid under the keypad. The intersecting lines are simple and low cost to manufacture.

Figure 5:
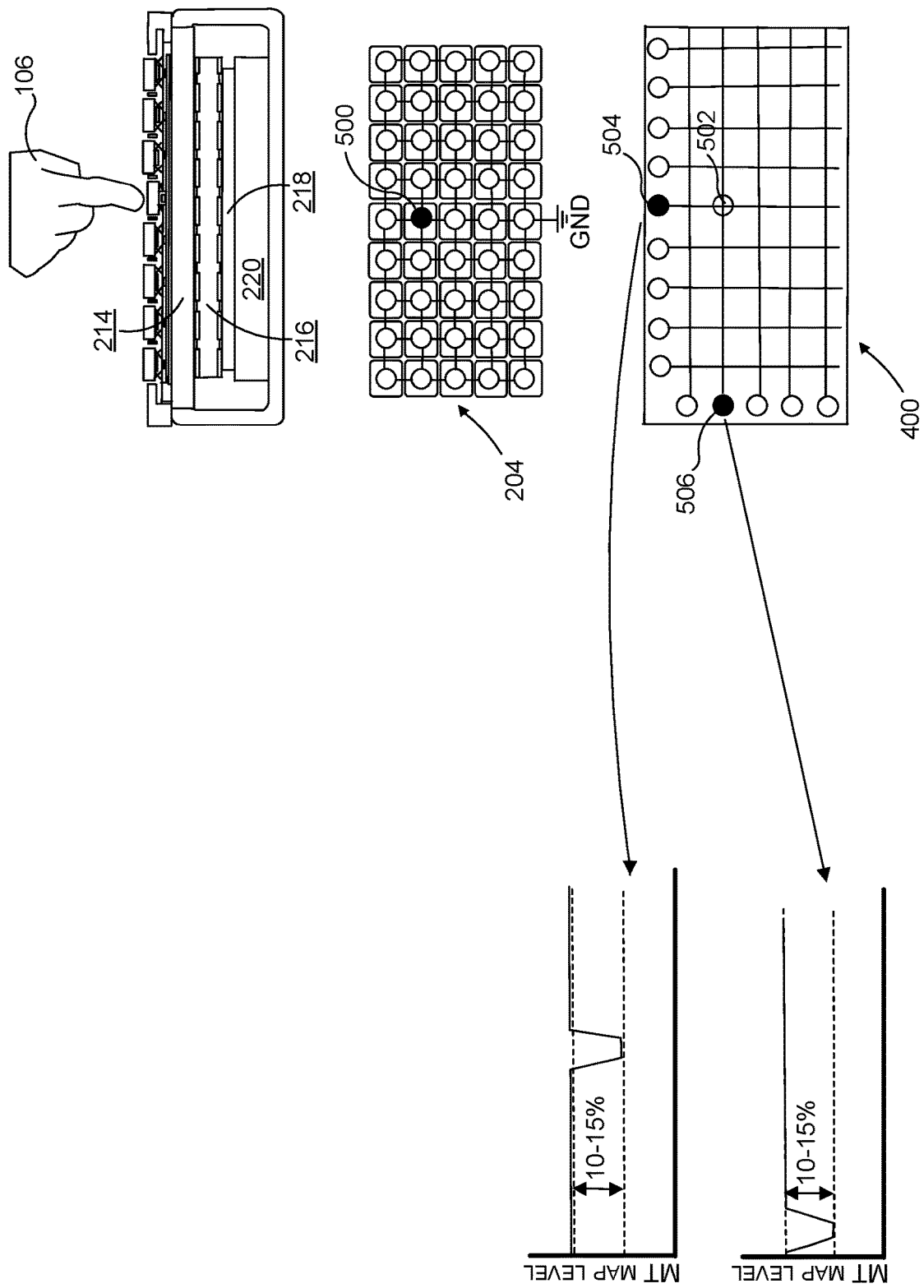
FIG. 5 is the cross section of FIG. 4 showing depression of a keypad and showing a resulting change in capacitance.

As shown in FIG. 5 the grid of intersecting conductive lines is sized and positioned such that when a keypad is depressed, a region 500 of the grounding layer moves towards an intersection 502 of the grid and grounds two of the blobs 504, 506, one at the end of each of the lines of the intersection, such that the touchscreen is able to determine which key is depressed by detecting the positions of the two grounded blobs 504, 506. By using a grid of intersecting conductive lines in this way a robust solution is achieved since pairs of blobs are detected in order to discriminate keypad presses from one another. Using pairs of blobs (and hence a pair of positions detected by the touchscreen) improves accuracy since if there is noise in the detected positions at the touchscreen (such as noise introduced by power cables or from a liquid crystal display unit of the touch screen) the effects of the noise are reduced by combining two measurements.

Figure 6:
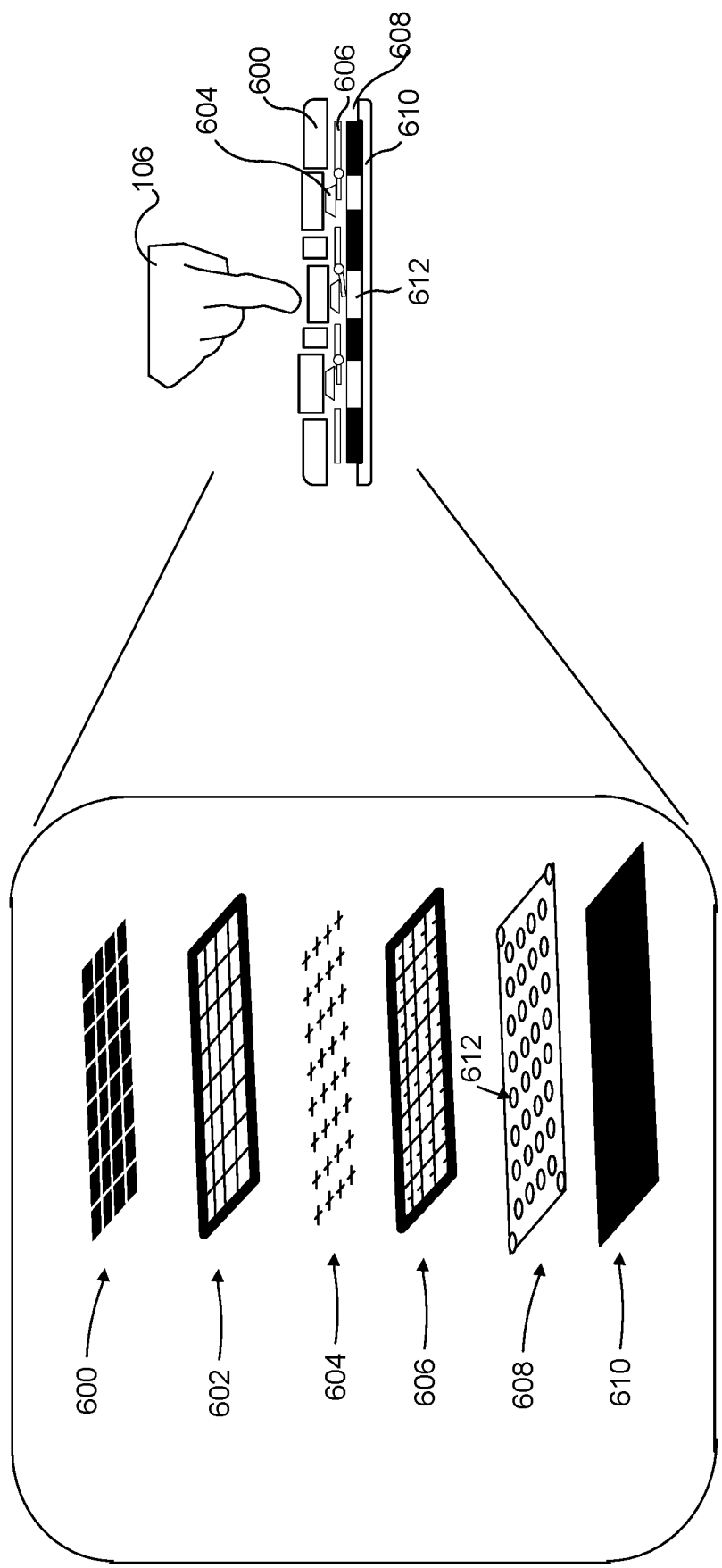
FIG. 6 is an exploded view of a keyboard.

FIG. 6 is an exploded view of a passive mechanical keyboard where the grounding layer is a metal frame 606. The metal frame extends over a plane of a major face of the keyboard and provides rigidity to the keyboard. The metal frame acts as a ground mass since it absorbs charge. In the example shown in FIG. 6 the metal frame has a cut away portion under each keypad, with a resiliently depressible metal leaf protruding into each cut away portion.

The exploded view in FIG. 6 shows the dielectric fabric skin 610 which covers the base of the keyboard. Immediately above the fabric skin 610 is an actuating layer 612 which in this example is a printed circuit board comprising a dielectric substrate with conductive blobs printed on it. The conductive blobs 612 are sized and positioned so that there is one blob under each keypad and so that the conductive blobs are electrically floated. In the example of FIG. 6 there is one conductive blob in each corner of actuating layer and the actuating layer is rectangular. The conductive blobs in the corners act as registration regions to allow a touchscreen to detect the presence of the keyboard.

Immediately above the actuating layer 608 is the metal frame 606 which is the grounding layer in this example. Immediately above the metal frame 606 is a layer of resiliently deformable elements 604 comprising silicone domes and plastic elements with a scissor-like shape. Immediately above the layer of resiliently deformable elements 604 is a keypad frame 602 made of plastic or other insulating material. The keypad frame has an array of apertures sized and shaped to hold the keypads. The layer of keypads 600 is shown as the top layer in FIG. 6 and comprises keypads made of plastic or other insulating material. It is not necessary for the keypads to comprise any conductive wires or plates or other conductive parts.

The right hand side of FIG. 6 shows the assembled keyboard assembled from the exploded layers on the left hand side of FIG. 6 except that the keypad frame 602 is omitted for clarity. The right hand side of FIG. 6 shows the situation where a user presses one of the keypads and this causes a region of the resiliently deformable layer under the keypad to be pressed down into a leaf of the grounding layer 606. The leaf of the grounding layer 606 flexes and contacts the conductive blob 612 under the keypad. As a result the conductive blob becomes grounded since any charge at the conductive blob 612 passes to the grounding layer 606. The change in capacitance is detected by the touchscreen under the fabric skin 610 (not shown in FIG. 6). Thus even if the user is wearing gloves the keypress is detected by the touchscreen. Note that it is not necessary for the keypad, keypad frame, resiliently deformable elements or fabric skin to have any conductive parts.

Figure 7:
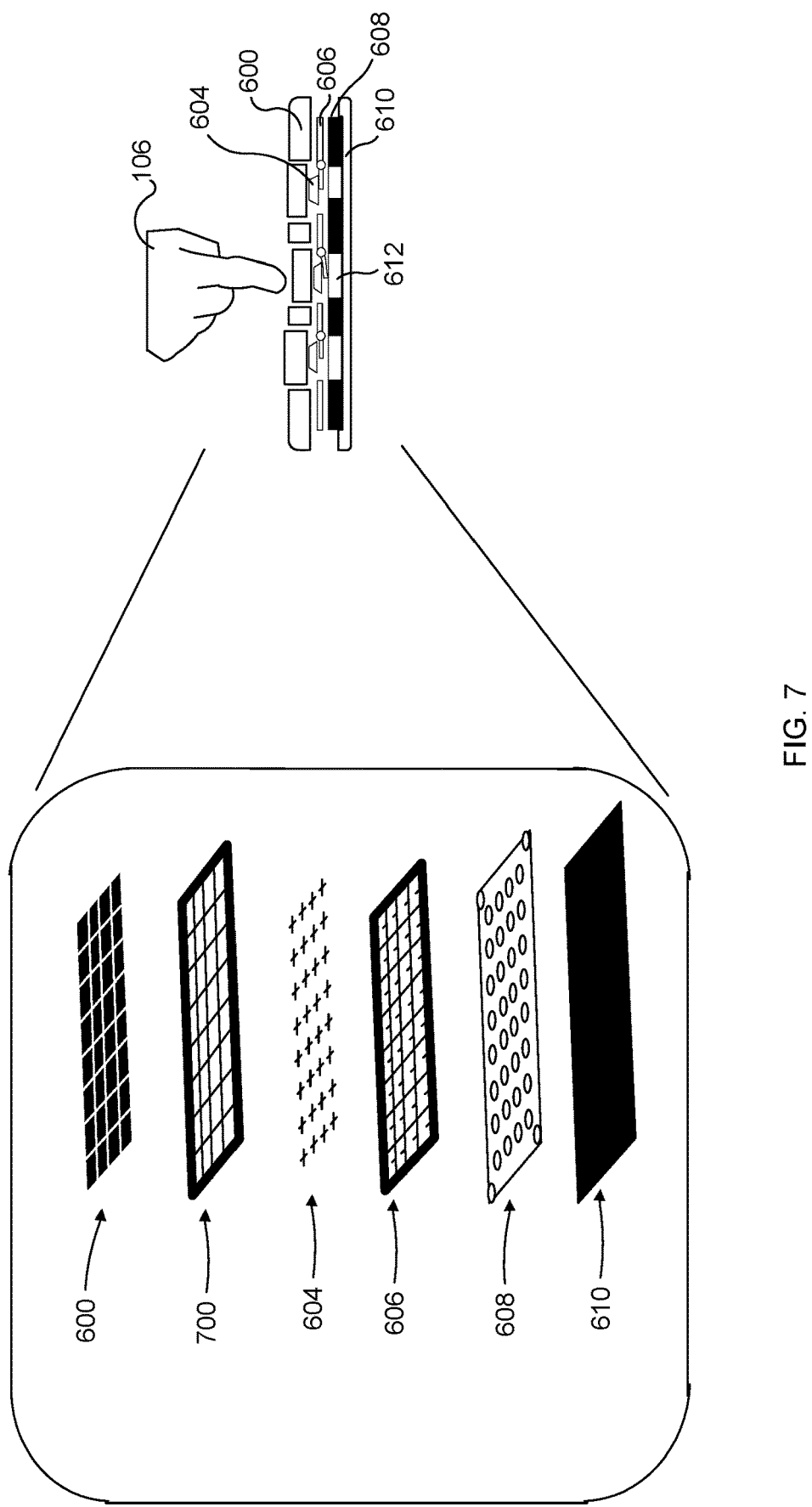
FIG. 7 is an exploded view of another keyboard.

FIG. 7 is an exploded view of a passive mechanical keyboard where the grounding layer is a metal frame 606 and the keypad frame is also metal 700. Here both the grounding layer and the keypad frame provide rigidity to the keyboard. The grounding layer is connected electrically to the keypad frame 700 by a metal track or wire or other conductive link. As a result the grounding ability of the grounding layer 606 is significantly enhanced because more charge may be held in the keypad frame and grounding layer 606 together. Because the grounding ability is enhanced the consequence is that keypresses made on the keyboard are more reliably and accurately detectable by the touchscreen.

The other components of the keyboard in FIG. 7 are the same as those of FIG. 6 and are assembled in the same manner as in FIG. 6.

Figure 8:
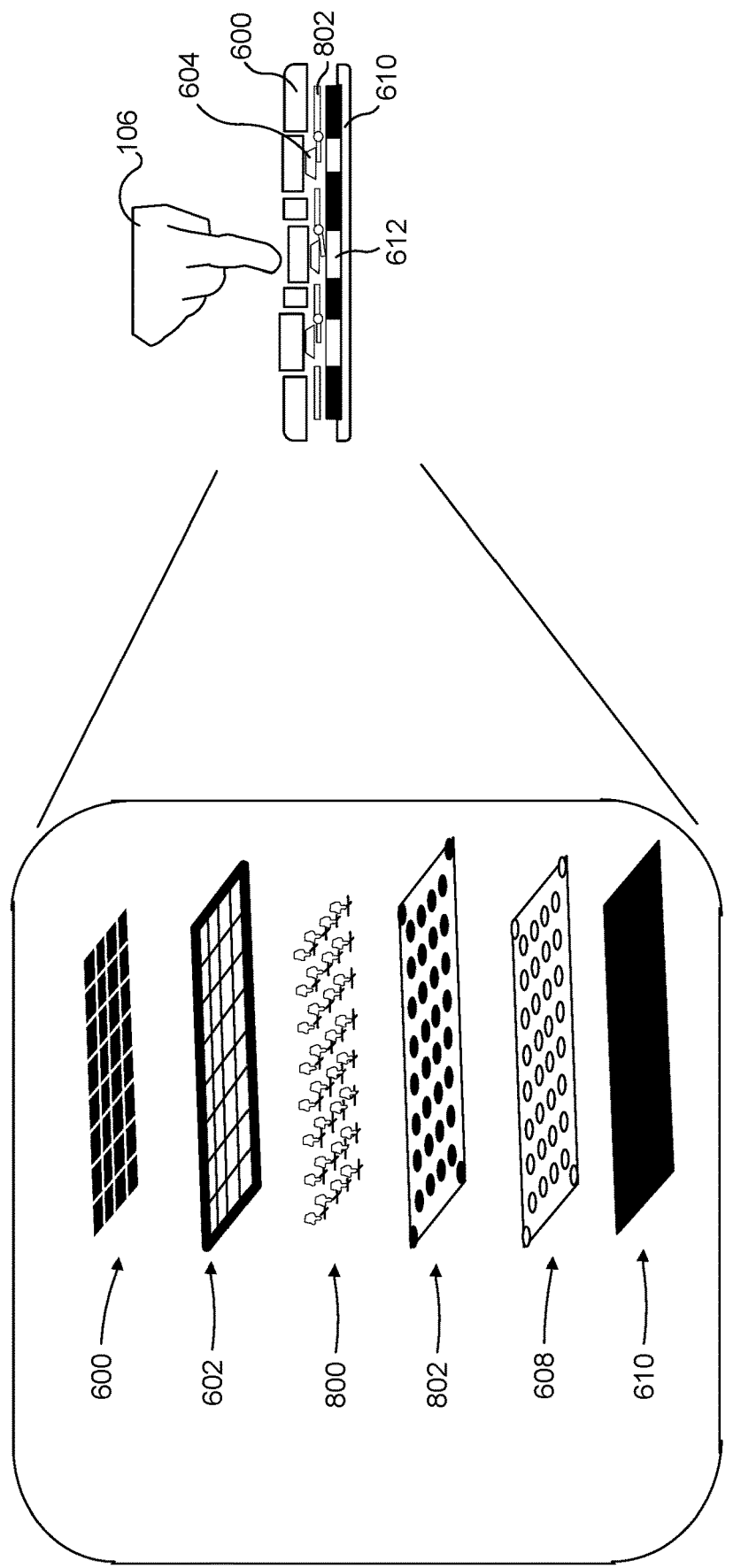
FIG. 8 is an exploded view of another keyboard.

FIG. 8 is an exploded view of another passive mechanical keyboard. In this case the resiliently deformable elements 800 are conductive, in contrast to the arrangements of FIGS. 6 and 7. The grounding layer 802 comprises a metal plate with one aperture for each resiliently deformable element. The apertures do not have leaves extending into them as in the case of FIG. 6. The keypads 600 are formed of plastic, the keypad frame 602 is also plastic. When a user presses a keypad (as indicated on the right hand side of FIG. 8) the keypad moves down and presses the corresponding resiliently deformable element. The resiliently deformable element moves down and extends through the corresponding aperture in the grounding layer, whilst also contacting the edges of the corresponding aperture in the grounding layer. The resiliently deformable element comes into close proximity with or touches the corresponding conductive blob on the actuating layer 608. Any charge on the conductive blob passes through the resiliently deformable element into the grounding layer and this produces a drop in capacitance at the conductive blob under the keypad. The touchscreen detects the drop in capacitance through the fabric skin 610.

Figure 9:
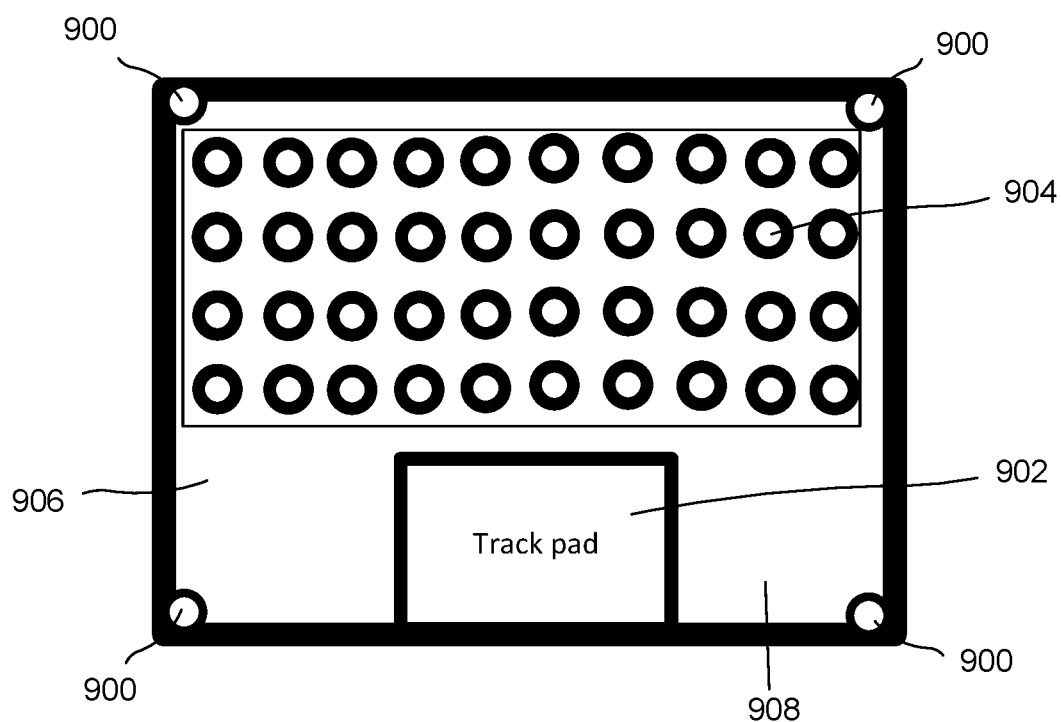
FIG. 9 is a plan view of an actuating layer of an example keyboard.

FIG. 9 is a plan view of an actuating layer of an example keyboard. The actuating layer in this example is rectangular and has registration regions 900 in its corners. Each registration region is a blob of conductive material which is surrounded by a non-conductive region indicated by the dark circle surrounding the blob 900 in FIG. 9 and which is connected to the grounding layer by a permanent connection (not shown in FIG. 9) to enable immediate detection when the keyboard is placed on a touchscreen. The actuating layer has one electrically floated blob 904 per keypad, sized and positioned to be under a keypad of the keypad layer of the keyboard.

In this example the actuating layer extends beyond the array of keypads into wrist support regions 906, 908, of the keyboard. In the center of a longer edge of the actuating layer is a track pad shaped aperture 902 which extends through the fabric skin and through which the touchscreen 104 is visible (when the actuating layer is placed on a touchscreen). The keypads, keypad frame, resiliently deformable elements, and grounding layer do not extend over the wrist support regions and track pad aperture and extend only over the electrically floated elements 904.

A much as possible of the surface area of the actuating layer is conductive in the example of FIG. 9 so that the wrist support regions are conductive. The actuating layer has a direct and permanent electrical connection to the grounding layer. When the user places his or her hands in a touch typing position on the keyboard, his or her wrists rest on the wrist support regions 906, 908 and as a result become grounded through the body of the user. Thus the grounding ability of the grounding layer is significantly enhanced by the regions of the actuating layer which are permanently electrically connected to the grounding layer. Consequently the change in capacitance at an actuating layer element 904 which occurs on a keypress event is increased and the touchscreen is better able to detect the keypress event and accurately recognize the keypad which was pressed.

Empirical measurement results are now described with reference to FIGS. 10A to 10F and these results demonstrate the effectiveness of the technology.

FIG. 10A shows a finger pressing on a cover glass of a touchscreen with no keyboard. In this case the change in capacitance is measured by the touchscreen as a result of the finger press when the touchscreen is floated (i.e. not grounded, not connected to a power supply and the user is not gripping it). The touchscreen is easily able to detect the touch event. FIG. 10A may be thought of as a reference situation in which there is a normal finger effect.

FIG. 10B shows a finger pressing on a fabric layer over the touchscreen of FIG. 10A. The situation of FIG. 10B is intended to be thought of as a normal finger effect on fabric. Here the measured change in capacitance at the touchscreen was 50 to 60% lower (which is 7 to 10 decibels lower) than the case of FIG. 10A when the touchscreen is floated. These results show how the change in capacitance is reduced by the presence of the fabric skin which is a significant problem that the present technology addresses. Because the change in capacitance is reduced it is harder for the touchscreen to accurately detect the touch event.

FIG. 10C shows a finger pressing on a plastic spacer over a conductive element on a touchscreen. The situation here is thought of as a normal passive keyboard direct touch without dielectric skin. Here the capacitance change measured at the touchscreen as a result of the touch event shows no change (means zero) where the touchscreen is floated. This result demonstrates how hard it is to create changes in capacitance where a passive keyboard comprising a plastic spacer and a conductive element are present (since the touchscreen is floated and the conductive element is floated as well).

FIG. 10D shows the situation of FIG. 10C and with a fabric layer between the touchscreen and the conductive element. Here the capacitance change measured at the touchscreen as a result of the touch event shows no change (means zero). This result demonstrates how difficult it is to create changes in capacitance where a passive keyboard comprising a plastic spacer and a conductive element and a dielectric fabric skin are present.

FIG. 10E shows a finger pressing on a plastic spacer on an electrically floating conductive metal plate on a conductive element on a touchscreen. The situation of FIG. 10E is thought of as a passive keyboard with no dielectric skin and with a grounding layer in the passive keyboard. Here the change in capacitance measured at the touchscreen is 22% (which is about 3.5 decibels) lower than the reference situation of FIG. 10A which is a significant improvement over the situations of FIG. 10C and demonstrates that the present technology is able to give good working solutions.

FIG. 10F shows the situation of FIG. 10E and with a fabric layer between the touchscreen and the conductive element. Here the change in capacitance measured at the touchscreen is 50% (which is 7 decibels) lower than the reference situation of FIG. 10A which is a significant improvement over the situations of FIG. 10D and demonstrates that the present technology is able to give good working solutions.

Figure 11:
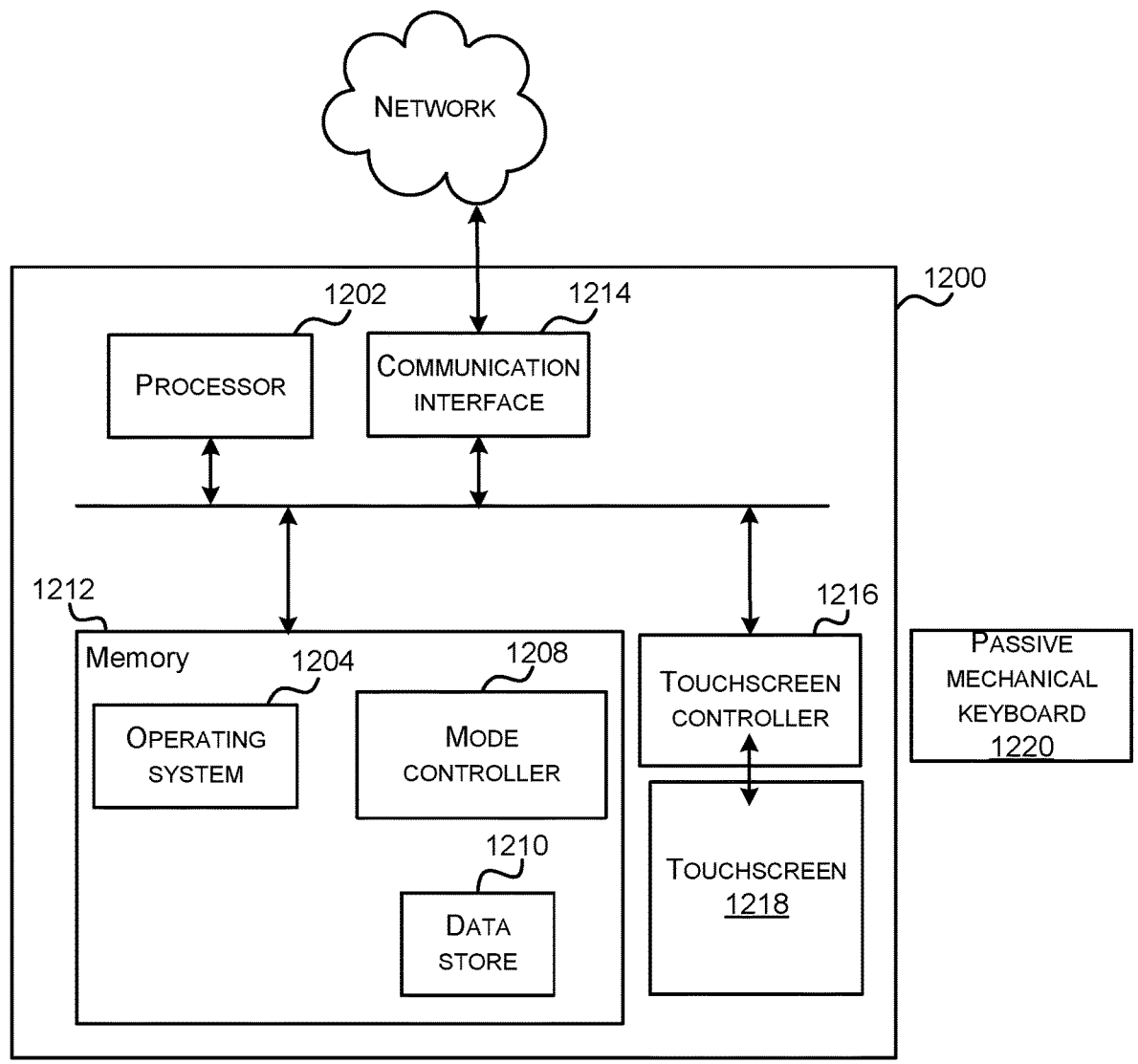
FIG. 11 is a schematic diagram of a computing-based device with a touchscreen and a touchscreen controller, and which is used with a passive mechanical keyboard.

FIG. 11 illustrates various components of an exemplary touchscreen computing-based device 1100 which is implemented as any form of a computing and/or electronic device, and which is suitable for use with a passive mechanical keyboard 1220 of the present technology. The computing-based device 1200 comprises a touchscreen 1218 and a touchscreen controller 1216. The touchscreen controller sends a drive signal to transmit electrodes of the touchscreen and receives and processes signals sensed on receive electrodes of the touchscreen. The touchscreen controller has a refresh rate which is a rate at which the drive signal is sent to the transmit electrodes and/or at which a signal is read from the receive electrodes.

Computing-based device 1200 comprises one or more processors 1202 which are microprocessors, controllers or any other suitable type of processors for processing computer executable instructions to control the operation of the device in order to operate a touchscreen 1218 with a passive mechanical keyboard. In some examples, for example where a system on a chip architecture is used, the processors 1202 include one or more fixed function blocks (also referred to as accelerators) which implement methods for controlling a touchscreen 1218 and/or for changing modes of operation of the computing-based device 1200 in hardware (rather than software or firmware). Platform software comprising an operating system 1204 or any other suitable platform software is provided at the computing-based device to enable application software to be executed on the device such as an electronic ink application or graphical user interface using touch screen input.

A mode controller 1208 at the computing-based device 1200 transitions the computing-based device between operation modes according to criteria it detects. The computing-based device only operates in one mode at a time. There are a plurality of possible modes of operation of the computing-based device including a keyboard mode, a pen mode and a touch mode. In pen mode the computing-based device interprets input at the touchscreen as input from a stylus designed for operation with the touchscreen. In touch mode the computing-based device interprets input at the touchscreen as input from a user's finger or other object touching the touchscreen. In keyboard mode, the computing-based device switches to a higher refresh rate of the touchscreen and interprets input at the touchscreen as keypress input from the passive mechanical keyboard. If the mode controller 1208 receives information from the touchscreen controller which indicates that a passive mechanical keyboard is present, such as specified user input, and/or detection of one or more registration regions on the passive mechanical keyboard 1220, it moves into keyboard mode. If the mode controller detects removal of the registration regions and/or receives user input indicating that the keyboard has been removed, it switches out of keyboard mode into touch mode or into pen mode.

A data store 1210 holds one or more mappings from touchscreen locations to keypad identities and associated characters. The data store also holds other data such as text characters typed on the keyboard.

The computer executable instructions are provided using any computer-readable media that is accessible by computing based device 1200. Computer-readable media includes, for example, computer storage media such as memory 1200 and communications media. Computer storage media, such as memory 1200, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1200) is shown within the computing-based device 1200 it will be appreciated that the storage is, in some examples, distributed or located remotely and accessed via a network or other communication link (e.g. using communication interface 1214).

Alternatively or in addition to the other examples described herein, examples include any combination of the following:

In an example there is a mechanical keyboard, comprising:

a keypad layer comprising a plurality of resiliently depressible keypads;

a skin of dielectric material, covering a base of the keyboard and having a touchscreen face configured to contact the capacitive touchscreen in use, and a working face;

an actuating layer on the working face of the skin of dielectric material, the actuating layer comprising a plurality of conductive regions, one per keypad;

a grounding layer between the actuating layer and the keypad layer and spaced from the actuating layer during a rest state of the keyboard; and wherein upon depression of one of the keypads, the keypad presses a region of the grounding layer under the keypad towards a region of the actuating layer such that the region of the actuating layer becomes grounded and causes a change in capacitance detectable by the capacitive touchscreen.

By having the grounding layer inside the keyboard and enabling regions of the grounding layer to move towards the actuating layer, it is possible to use keypads which are not conductive and which do not have any connection directly to a ground. Also, it is possible to have a dielectric skin to protect the keyboard and which is lightweight and comfortable to use by a person.

In an example, the grounding layer comprises a metal frame with a cut away portion under each keypad, and where the metal frame comprises a resiliently depressible metal leaf protruding into each cut away portion. The metal frame acts as a ground mass and it provides rigidity to the keyboard. By having the metal leaves a way to have a resiliently moving part which is conductive is given to enable the grounding layer to come into contact or close proximity with the actuating layer.

In an example, the grounding layer is electrically connected to a metal keypad frame which holds the keypads. In this way the grounding ability of the grounding layer is enhanced by the keypad frame and so the change in capacitance created by a keypress is increased. In some cases the metal keypad frame comprises a wrist support. When a user rests his or her wrists on the metal keypad frame the metal keypad frame becomes connected to ground through the user's body. Thus in turn the grounding layer is connected to ground through the keypad frame and the user's body and the ability of the keyboard to generate a change in capacitance as a result of a keypad press is enhanced.

In an example, the grounding layer comprises, for each keypad, a blob of electrically conducting material, where the blobs are connected to one another by conductive tracks. This gives a way of individuating the grounding layer for each keypad which is useful to enable an individual region of the grounding layer to be moved towards the actuating layer when a keypad is pressed.

In an example the grounding layer comprises a conductive keyboard bucket configured for attachment to the touchscreen. The keyboard bucket acts to hold the keypads and also provides a connection to the ground of the touchscreen which facilitates the operation of the grounding layer to enable capacitance changes when keypads are pressed.

In an example the actuating layer comprises a grid of intersecting conductive lines, each line having a blob of conductive material at an end of the line, and where for each keypad there is an intersection of the grid under the keypad. In this case the actuating layer is simple and low cost to construct.

In examples the grid of intersecting conductive lines is sized and positioned such that when a keypad is depressed, a region of the grounding layer moves towards an intersection of the grid and grounds two of the blobs, one at the end of each of the lines of the intersection, such that the touchscreen is able to determine which key is depressed by detecting the positions of the two grounded blobs. This improves the ability to deal with noise since there are two positions which are detected by the touchscreen for each keypress.

In an example the actuating layer comprises a plurality of electrically floated blobs, with one electrically floated blob under each keypad. The blobs are printed onto the actuating layer substrate to achieve a low cost method of construction and in some cases the substrate of the actuating layer is a fabric skin of the keyboard.

In an example the actuating layer comprises conductive material covering as much of the actuating layer as possible whilst maintaining the blobs as electrically floated, the conductive material being connected to the grounding layer. This enables the ground mass of the grounding layer to be increased and so increases the grounding ability of the grounding layer.

In some cases the actuating layer comprises regions sized and shaped to support wrists of a user when typing using the keyboard. The regions are grounded through the wrists of the user in operation.

In an example the actuating layer has at least one registration region comprising a conductive region connected to the grounding layer and spaced from the keypads. The touchscreen is thus able to detect the position of the registration region and determine the location and presence of the keyboard, by detecting the registration regions.

In an example the actuating layer comprises a plurality of touchscreen registration regions, each located in a corner of the keyboard. This is useful where the keyboard is rectangular or square since it enables the touchscreen to determine the extent of the keyboard.

In an example the touchscreen registration region has a specified size and shape detectable by the touchscreen in order to trigger a keyboard mode of the touchscreen. This enables the touchscreen to know that a particular type or model of keyboard is present and to move into a keyboard mode suitable for that type or model.

In some cases the skin, and grounding layer (or actuating layer) extend beyond the keypad, to form a wrist support region, and the wrist support region comprises an aperture sized and shaped to allow a user of the keyboard to directly touch the capacitive touchscreen as if operating a trackpad. This is a cost effective and practical way of enabling a user to have trackpad type functionality to move a cursor and operate a graphical user interface at the computing device, in conjunction with the mechanical keyboard. The user is able to transfer his or her skills at operating a conventional trackpad to the situation with the trackpad type aperture in the passive keyboard.

Note that the keypads are either conductive or not conductive depending on the embodiment of the technology. In the case of non-conductive keypads the user is able to operate the keyboard whilst wearing gloves.

In an example the passive mechanical keyboard comprises a layer of resiliently deformable elements under the keypad layer. This gives the benefit of making the keypads resiliently depressible. In some, but not all cases, the resiliently deformable elements are conductive.

In an example there is a computing device comprising:
 a touchscreen for providing a position signal indicative of location thereon;
 a passive mechanical keyboard removably attached to the touchscreen, the passive mechanical keyboard comprising:
  a keypad layer comprising a plurality of resiliently depressible keypads;
  a skin of dielectric material, covering a base of the keyboard and having a touchscreen face configured to contact the capacitive touchscreen in use, and a working face;
  an actuating layer on the working face of the skin of dielectric material, the actuating layer comprising a plurality of conductive regions, one per keypad;
  a grounding layer, configured to be grounded to the capacitive touchscreen in use, the grounding layer being between the actuating layer and the keypad layer and spaced from the actuating layer during a rest state of the keyboard; and
  wherein upon depression of one of the keypads, the keypad presses a region of the grounding layer under the keypad towards a region of the actuating layer such that the region of the actuating layer becomes grounded and causes a change in capacitance detectable by the capacitive touchscreen.

In some cases the computing device is operable in only one of a plurality of modes at any one time, the modes comprising: a keyboard mode, a touch mode and a pen mode; and wherein the touchscreen is configured to operate at a higher refresh rate in the keyboard mode than in the other ones of the modes, and wherein the computing device is configured to operate in the keyboard mode in dependence on detection of the presence of the passive mechanical keyboard.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A mechanical keyboard for communicatively coupling with a capacitive touchscreen, comprising:
    a keypad layer comprising a plurality of depressible keypads;
    a skin of dielectric material covering a base, the skin of dielectric material having a face configured to contact the capacitive touchscreen;
    a printed circuit board coupled to the face, the printed circuit board comprising respective conductive regions for the depressible keypads;
    a grounding layer between the printed circuit board and the keypad layer, the grounding layer being spaced from the printed circuit board during a rest state of the keyboard; and
    wherein upon depression of one of the depressible keypads, the one of the depressible keypads presses a corresponding conductive region of the grounding layer under the one of the depressible keypads towards a conducting region of the printed circuit board such that the conducting region becomes grounded and causes a change in capacitance detectable by the capacitive touchscreen.

2. The mechanical keyboard of claim 1 wherein the grounding layer comprises a metal frame with a cut away portion under each keypad, and where the metal frame comprises a depressible metal leaf protruding into each cut away portion.

3. The mechanical keyboard of claim 1 wherein the grounding layer is electrically connected to a metal keypad frame which holds the depressible keypads.

4. The mechanical keyboard of claim 3 wherein the metal keypad frame comprises a wrist support.

5. The mechanical keyboard of claim 1 wherein the grounding layer comprises, for each keypad, a blob of electrically conducting material, and wherein the blob is connected to one another by conductive tracks.

6. The mechanical keyboard of claim 1 wherein the grounding layer comprises a conductive keyboard bucket configured for attachment to the capacitive touchscreen.

7. The mechanical keyboard of claim 1 wherein the printed circuit board comprises a grid of intersecting conductive lines, each line having a blob of conductive material at an end of the line, and where for each keypad there is an intersection of the grid under the keypad.

8. The mechanical keyboard of claim 7 wherein the printed circuit board comprises conductive material covering the printed circuit board whilst maintaining the blobs as electrically floated, the conductive material being connected to the grounding layer.

9. The mechanical keyboard of claim 7 wherein the grid of intersecting conductive lines is sized and positioned such that when a keypad is depressed, a region of the grounding layer moves towards an intersection of the grid and grounds two of the blobs, one at the end of each of the lines of the intersection, such that the capacitive touchscreen is able to determine which key is depressed by detecting positions of the two grounded blobs.

10. The mechanical keyboard of claim 1 wherein the printed circuit board comprises a plurality of electrically floated blobs, with one electrically floated blob under each keypad.

11. The mechanical keyboard of claim 1 wherein the printed circuit board comprises ground regions sized and shaped to support wrists of a user when typing using the keyboard.

12. The mechanical keyboard of claim 11 wherein the printed circuit board comprises a plurality of touchscreen registration regions, each located in a corner of the keyboard.

13. The mechanical keyboard of claim 1 wherein the printed circuit board has at least one touchscreen registration region comprising a conductive region connected to the grounding layer and spaced from the depressible keypads.

14. The mechanical keyboard of claim 13 wherein the touchscreen registration region has a specified size and shape detectable by the capacitive touchscreen in order to trigger a keyboard mode of the capacitive touchscreen.

15. The mechanical keyboard of claim 1 wherein the skin, and grounding layer extend beyond the depressible keypads and the printed circuit board to form a wrist support region.

16. The mechanical keyboard of claim 1 wherein the depressible keypads are either conductive or not conductive.

17. The mechanical keyboard of claim 1 comprising a layer of deformable elements under the keypad layer and acting to make the depressible keypads depressible.

18. The mechanical keyboard of claim 17 wherein the deformable elements are conductive.

19. A computing device comprising:
a base;
a capacitive touchscreen for providing a position signal indicative of location thereon;
a mechanical keyboard removably attached to the capacitive touchscreen, the mechanical keyboard comprising:
a keypad layer comprising a plurality of depressible keypads;
a skin of dielectric material covering the base and having a face configured to contact the capacitive touchscreen;
a printed circuit board coupled to the face, the printed circuit board comprising respective conductive regions for the depressible keypads;
a grounding layer configured to be grounded to the capacitive touchscreen in use, the grounding layer being between the printed circuit board and the keypad layer and spaced from the printed circuit board during a rest state of the keyboard; and
wherein upon depression of one of the depressible keypads, the one of the depressible keypads presses a corresponding conductive region of the grounding layer under the one of the depressible keypads towards a conducting region of the printed circuit board such that the conducting region of the printed circuit board becomes grounded and causes a change in capacitance detectable by the capacitive touchscreen.

20. The computing device of claim 19 wherein the computing device is operable in only one of a plurality of modes at any one time, the modes comprising: a keyboard mode, a touch mode and a pen mode; and
wherein the capacitive touchscreen is configured to operate at a higher refresh rate in the keyboard mode than touch mode or the pen mode, and wherein the computing device is configured to operate in the keyboard mode in dependence on detection of a presence of the passive mechanical keyboard.

\* \* \* \* \*